Oct. 11, 1938.                F. INNOCENTI                    2,133,197
                DEVICE FOR UNITING TUBES OF METALLIC STRUCTURES
                              Filed Dec. 1. 1936
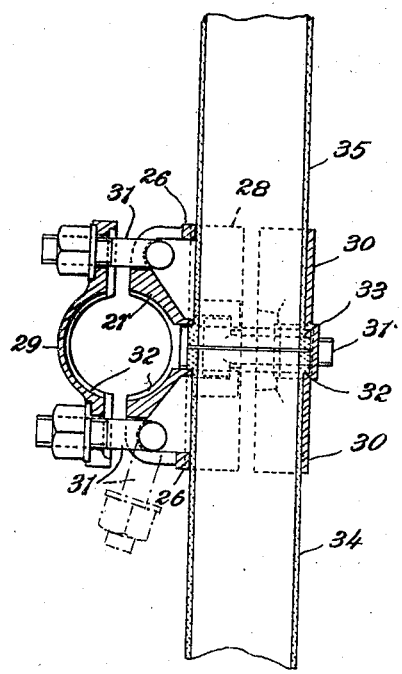

UNITED STATES PATENT OFFICE 2,133,197

DEVICE FOR UNITING TUBES OF METALLIC STRUCTURES

Ferdinando Innocenti, Rome, Italy

Application December 1, 1936, Serial No. 113,747
In Italy February 8, 1936

1 Claim. (Cl. 189—36)

The present invention has for its object to provide a union piece or joint for uniting two contiguous parallel tubes, or two tubes joined by their heads respectively or for various other uses as will be particularly indicated hereinafter. The first case occurs if in a metallic tubular structure two tubes are to be placed in parallel so as to co-operate in order to provide a tubular aggregate of greater resistance to pressure, fraction or torsion than a single tube would be capable of. The second case occurs when it is necessary to obtain a single tubular element of greater length than that of existant tube lengths. However the joints subject matter of invention have also other uses within the range of the invention.

The invention will now be described by a non-limiting example with reference to the annexed drawing, in which:

The single figure shows a joint for cross tubes with anchorage grooves for the tubes.

In tubular metal structures where joints are used comprising half cylindrical sleeves fixed in couples around each tube by bolts, clamps or pins and preventing by mere friction the tube from sliding with respect to the joint, it is known that the longitudinal strain applied to the tube with respect to the joint may sometimes exceed the frictional force so as to produce relative sliding between joint and tube, which is always obnoxious, though not absolutely dangerous, for the whole metal structure. This is particularly the case of the lower joints of metallic tubular structures and scaffoldings, but in many cases may also extend to other joints than those of said structures and scaffoldings.

The said drawback of simple friction joints is removed by the present invention by effecting connection between joint and tube by positive engagement of a collar or flange supported on the tube with an annular groove provided in the interior of the half sleeves embracing the tube.

The single figure of the drawing is a vertical axial section of a joint according to invention, applied to a vertical tube provided with flange.

On the central body or core 26 formed of two half sleeves 27 and 28, half sleeves 29 and 30 are clamped by T-bolts 31 with cylindrical heads normal to their axis.

Each pair of half sleeves 27, 28 and 29, 30 respectively, has an annular groove 32 in which flanges 33 of tubes 34, 35 are placed. For clearness sake the tube is not shown in the horizontal sleeve 27, 29 in the drawing.

Instead of terminal flanges 33 the tube may be provided with welded, riveted or otherwise fixed collars at any intermediate point between its two ends so that the joint may not only be fixed to the end of each tube length, but also at any intermediate point.

In the same groove 32 of a joint in the example shown in the drawing two flanges 33 are placed belonging to two different tubes.

The invention has been described and illustrated in a preferred form, but it is capable in practice of structural variations within its limits of protection as laid down in the claim.

Having now particularly described and ascertained the nature of my said invention and in what manner the same is to be performed, I declare that what I claim is:

A device for coupling tubular elements comprising, a body member having two half sleeve portions, each half sleeve portion being adapted to partly surround one of the tubular elements to be joined, said half sleeve portions each having a circumferentially extending groove into which a flange of the respective tubular element is adapted to be arranged, a third half sleeve member having a circumferentially extending groove therein adapted to partly embrace one of the tubular elements adjacent one of the first mentioned half sleeve portions and removably secured to the body member, and a fourth half sleeve member having a circumferentially extending groove therein adapted to partly surround the other of the tubular elements adjacent the other of the first mentioned half sleeve portions and removably secured to the body member.

FERDINANDO INNOCENTI.